United States Patent [19]

Kohlenberger

[11] Patent Number: 5,790,972
[45] Date of Patent: Aug. 4, 1998

[54] METHOD AND APPARATUS FOR COOLING THE INLET AIR OF GAS TURBINE AND INTERNAL COMBUSTION ENGINE PRIME MOVERS

[76] Inventor: Charles R. Kohlenberger, 611 S. Euclid St., Fullerton, Calif. 92635

[21] Appl. No.: 519,073

[22] Filed: Aug. 24, 1995

[51] Int. Cl.[6] ........................................................ F02C 1/00
[52] U.S. Cl. .................. 701/103; 701/104; 701/105; 60/39.02; 60/39.53
[58] Field of Search ................. 364/431.01, 431.02, 364/431.03, 431.04; 60/39.02, 39.53

[56] References Cited

U.S. PATENT DOCUMENTS

| | | | |
|---|---|---|---|
| 4,213,738 | 7/1980 | Williams | 416/95 |
| 4,285,917 | 8/1981 | Knight | 423/224 |
| 4,619,240 | 10/1986 | Bedford et al. | 123/575 |
| 4,668,162 | 5/1987 | Cederwall et al. | 415/115 |
| 4,905,637 | 3/1990 | Ott | 123/58 B |
| 5,278,772 | 1/1994 | Knupp | 364/492 |
| 5,444,971 | 8/1995 | Kolenberger | 60/39.02 |

*Primary Examiner*—Kevin J. Teska
*Assistant Examiner*—Tyrone V. Walker
*Attorney, Agent, or Firm*—Marcus Theodore

[57] ABSTRACT

A multi-stage method and apparatus for cooling the inlet air of internal combustion engine and gas turbine prime movers associated with various load applications comprising: generating and providing a multi-stage refrigerated cooling system associated with the air inlet of internal combustion engine and gas turbine prime movers which provides thermodynamic efficiencies in accordance with a divided psychrometric inlet air cooling path enthalpy curve; cascading the cooled refrigerant from stage to stage to cool primary or secondary refrigerant from a first cooling stage as a pre-cooling heat transfer coolant to exchange against and sub-cool subsequent stages of primary or secondary refrigerant for cooling to the desired temperature; energizing power means to drive the prime mover and refrigerant cooling system; and adjusting the power means based on current energy costs to optimize net revenues to produce electricity or useful work from the prime mover application.

11 Claims, 9 Drawing Sheets

GTIAC Flow Diagram
3-Stage Cooling (Secondary Water/Brine)

Psychrometric Load Analysis - Process Air Path

GTIAC System
3-Stage Cooling Coil/Refrigerant Heat Exchange
(Dallas, Texas - 1% ASHRAE Data)
Figure 3

GTIAC Flow Diagram
3-Stage Cooling (Secondary Water/Brine)

Figure 4

GTIAC Flow Diagram
3-Stage Cooling (Primary Refrigerant)

Gas Turbine Inlet Air Cooling Recap

GT Performance Comparisons Westinghouse 501D5

| Line No. | Description | Non-Cooled (Base) | Evaporative Cooling | 1 - Stage Refrigeration | 3 - Stage Refrigeration |
|---|---|---|---|---|---|
| 1 | Site Ambient Air Conditions (1% ASHRAE) | 102/75/29% | 102/75/29% | 102/75/29% | 102/75/29% |
| 2 | Dry Bulb, Wet Bulb Temperature (F) and Relative Humidity (%) | to | to | to | to |
| 3 | GT Inlet Air Condition at Compressor Bellmouth | 102/75/29% | 79/75/83% | 40/40/99% | 40/40/99% |
| 4 | Refrigeration System Calculations | | | | |
| 5 | GT Mass Flow (Lbs/Hr) | 2,683,957 | 2,779,475 | 3,056,788 | 3,056,788 |
| 6 | Refrigeration Load (Tons) | - | - | 5,949 | 5,949 |
| 7 | Refrigeration Horsepower (BHP) | - | - | 5,667 | 4,281 |
| 8 | Refrigeration Unit Power (kW/TR) | - | - | 0.888 | 0.671 |
| 9 | Refrigeration Parasitic Load (mW) | - | - | 5.28 | 3.99 |
| 10 | GTG Power Output Calculations | | | | |
| 11 | Gross GTG Power Output Adjustment Factor | 0.9103 | 1.0038 | 1.1677 | 1.1677 |
| 12 | Gross GTG Power Output (mW) | 107.87 | 118.95 | 138.37 | 138.37 |
| 13 | Refrigeration Parasitic Load (mW) | - | - | (5.28) | (3.99) |
| 14 | Net GTG Power Output (mW) | 107.87 | 118.95 | 133.09 | 134.38 |
| 15 | Net Added GTG Power Output from Base (mW) | - | 11.08 | 25.22 | 26.51 |
| 16 | Percent Added GT Power Output from Base (%) | - | 10.3% | 23.4% | 24.6% |
| 17 | GT Heat Rate Calculations | | | | |
| 18 | Net GT Heat Rate Adjustment Factor | 1.0840 | 1.0590 | 1.0170 | 1.0170 |
| 19 | GT Heat Rate (BTU/kWH) | 10,864 | 10,616 | 10,198 | 10,198 |
| 20 | Reduced GT Heat Rate from Base (BTU/kWH) | - | 248 | 666 | 666 |
| 21 | Percent Reduced GT Heat Rate from Base (%) | - | 2.3% | 6.1% | 6.1% |
| 22 | GT Water Flow Rate (Lbs/Hr) | 54,518 | 58,750 | 65,647 | 65,647 |
| 23 | GT Fuel Flow Rate (Lbs/Hr) | 65,422 | 70,500 | 78,776 | 78,776 |
| 24 | Total System Water Consumption Rate (Lbs/Hr) | 65,422 | 100,347 | 190,279 | 190,279 |
| | Annual GTIAC Owning and Operating Cost Comparisons | | | | |
| 25 | Annual Power Sales/Offset ($) | $51,286,376 | $52,170,005 | $56,502,363 | $56,701,132 |
| 26 | Added Power Sales/Offset of 1-Stage vs. 3-Stage GTIAC System | - | - | - | $198,769 |
| 27 | Annual GTIAC Operating Cost Calculations | | | | |
| 28 | Net Added Fuel Cost ($) | $24,982,778 | $25,219,180 | $27,008,803 | $27,008,803 |
| 29 | Water Cost ($) | $97,309 | $103,904 | $176,432 | $176,432 |
| 30 | GTIAC Maintenance Cost ($) | - | $44,407 | $177,629 | $177,629 |
| 31 | Annual GTIAC Operating Cost ($) | $25,080,087 | $25,367,491 | $27,362,864 | $27,362,864 |
| 32 | Annual Power Sales/Offset less Annual GTIAC Operating Cost ($) | $26,206,289 | $26,802,514 | $29,139,499 | $29,338,268 |
| | GT Economics Comparisons vs. Non-Cooled (Base) | | | | |
| 33 | Net Added Revenue with Inlet Air Cooling from Non-Cooled ($) | - | $596,225 | $2,933,210 | $3,131,979 |
| 34 | Net System Installed Budget Estimate ($) | - | $300,000 | $5,950,000 | $5,950,000 |
| 35 | Actual Project Payback (Years) | - | < 1 Year | 2.00 | 1.87 |
| 36 | Net Present Value (NPV) @ 12% for 10 Years ($) | - | $3,490,000 | $13,180,000 | $14,430,000 |
| 37 | Internal Rate of Return (IRR) for 10 Years (%) | - | n/a | 103% | 117% |
| 38 | Equivalent Site GTG Capacity Cost per Added kWH | | | | |
| 39 | Effective Installed Budget Estimate ($) Line 34 - Line 33 | - | ($296,225) | $3,016,790 | $2,818,021 |
| 40 | GTG Power Output Adjustment Factor from ISO (Non-Cooled) | - | 0.8377 | 0.8377 | 0.8377 |
| 41 | Net Added GTG Power Output (mW) | - | 11.08 | 25.22 | 26.51 |
| 42 | Effective Cost per Added kW ($/kW) | - | n/a | $100 | $89 |
| | GT Economics Comparisons vs. Evaporative Cooled | | | | |
| 43 | Net Added Revenue with Inlet Air Cooling from Evap Cooled ($) | - | - | $2,336,985 | $2,535,754 |
| 44 | Net System Installed Budget Estimate ($) | - | - | $5,650,000 | $5,650,000 |
| 45 | Actual Project Payback (Years) | - | - | 2.37 | 2.19 |
| 46 | Net Present Value (NPV) @ 12% for 10 Years ($) | - | - | $9,690,000 | $10,940,000 |
| 47 | Internal Rate of Return (IRR) for 10 Years (%) | - | - | 75% | 86% |
| 48 | Equivalent Site GTG Capacity Cost per Added kWH | | | | |
| 49 | Effective Installed Budget Estimate ($) Line 44 - Line 43 | - | - | $3,313,015 | $3,114,246 |
| 50 | GTG Power Output Adjustment Factor from ISO (Evap Cooled) | - | - | 0.9244 | 0.9244 |
| 51 | Net Added GTG Power Output (mW) | - | - | 14.14 | 15.43 |
| 52 | Effective Cost per Added kW ($/kW) | - | - | $217 | $187 |

Economic savings based on Kohlenberger multi-stage primary refrigerant GTIAC System.

FIG. 8

GTIAC Conclusions/Final Recap Comparison

GT Performance Comparisons Westinghouse 501D5

| Line No. | Description | Non-Cooled (Base) | Evaporative Cooling | 1 - Stage Refrigeration | 3 - Stage Refrigeration |
|---|---|---|---|---|---|
| 1 | Net GTG Power Output (mW) | 107.9 | 119.0 | 133.1 | 134.4 |
| 2 | Output Gain vs. Non-Cooled (mW) | - | 11.1 | 25.2 | 26.5 |
| 3 | Output Gain vs. Evap Cooled (mW) | - | - | 14.1 | 15.4 |
| 4 | Net GT Heat Rate (BTU/kWH) | 10,864 | 10,616 | 10,198 | 10,198 |
| 5 | Heat Rate Reduction vs. Non-Cooled (%) | - | 2.3% | 6.1% | 6.1% |
| 6 | Heat Rate Reduction vs. Evap Cooled (%) | - | - | 3.9% | 3.9% |
| 7 | Power Sales less Operating Cost | $26,210,000 | $26,800,000 | $29,140,000 | $29,340,000 |
| 8 | Increased Revenue vs. Non-Cooled | - | $590,000 | $2,930,000 | $3,130,000 |
| 9 | Increased Revenue vs. Evap Cooled | - | - | $2,340,000 | $2,540,000 |
| 10 | Net System Installed Budget Estimate ($) | - | $300,000 | $5,950,000 | $5,950,000 |
| 11 | Actual Project Payback vs. Non-Cooled | - | < 1 Year | 2.0 Years | 1.9 Years |
| 12 | Actual Project Payback vs. Evap Cooled | - | - | 2.4 Years | 2.2 Years |
| 13 | NPV vs. Non-Cooled (12%/10 Yrs) | - | $3,490,000 | $13,180,000 | $14,430,000 |
| 14 | NPV vs. Evap Cooled (12%/10 Yrs) | - | - | $9,690,000 | $10,940,000 |
| 15 | IRR vs Non-Cooled (10 Years) | - | n/a | 103% | 117% |
| 16 | IRR vs Evap Cooled (10 Years) | - | n/a | 75% | 86% |
| 17 | Cost per Added kW vs Non-Cooled ($/kW) | - | - | $100 | $89 |
| 18 | Cost per Added kW vs Evap Cooled ($/kW) | - | - | $217 | $187 |

Figure 9

METHOD AND APPARATUS FOR COOLING THE INLET AIR OF GAS TURBINE AND INTERNAL COMBUSTION ENGINE PRIME MOVERS

BACKGROUND OF THE INVENTION

1. Field

This invention pertains to methods for increasing the performance for gas turbines and internal combustion (IC) engines.

Specifically, it relates to a new multi-stage method and apparatus for cooling the inlet air of gas turbines and internal combustion engines to increase their power output and combustion efficiencies.

2. State of the Art

Kohlenberger, U.S. Pat. No. 5,444,971, describes a Method and Apparatus for Cooling the Inlet Air of Gas Turbine and Internal Combustion Prime Movers, which increases the performance of a gas turbine or internal combustion engine by cooling the air inlet to densify the air mass flowing into the engine and into the gas turbine compressor blades or engine cylinders. The performance benefits are accomplished by the sequential staging of the cooling coils in the airstream in serial fashion allowing increased refrigeration efficiency. Additional refrigeration efficiencies are gained via the cascading from stage to stage of cooled primary or secondary refrigerant from the first cooling stage, to subcool directly or indirectly the refrigerant for the subsequent stages to sequentially cool the air inlet stream entering the compressor. The turbine performance increase is limited by the lowest temperature of inlet air provided by the interconnected first and second stages (or more if in multiple succeeding stages) of compatible primary or secondary refrigerant systems which interchange the refrigerant which is fed from stage to stage, directly or indirectly.

Therefore, although the staged single cooled primary or secondary refrigerant feed system is workable and economical, maximum performance increases are achieved by providing an improved multi-stage constant air cooling system method and apparatus for optimizing turbine and engine performance which utilizes systems with interchanging refrigerant feeds from stage to stage. These multi-stage systems can also be arranged in primary/secondary hybrid combinations. This involves the use of primary evaporating refrigerant created in a conventional compressor system and used in the latter stages of cooling in combination with chilled water/brine or well water as a secondary refrigerant chilled in any variety of chillers and drivers used in first stages of inlet air cooling. Additionally, the secondary refrigerant (chilled water, brine, etc.) could be generated in a thermal energy storage mode by making and storing chilled water or brine or ice at off-peak low cost energy times for usage during peak energy power generation periods where energy costs to produce secondary refrigerant are higher.

The invention described below provides such a system.

SUMMARY OF THE INVENTION

The present method and apparatus optimizes the electrical power output performance of gas turbine and internal combustion engine prime movers which can drive a variety of rotating loads, i.e. pumps, generators, compressors, or electrical generator sets. This optimization is accomplished by cooling the turbine/engine inlet air which increases its mass density and throughput. It comprises: first creating a psychrometric inlet air cooling path enthalpy curve beginning with the average ambient air temperature entering the turbine/engine and reducing the air temperature to the optimum air inlet temperature above the ice point for maximum performance. The psychrometric inlet air cooling path enthalpy curve is then sectionalized and divided into dedicated multiple cooling stages to optimize thermodynamic cooling of the refrigeration cycle efficiencies by operating the turbine along the least energy intensive segments of the enthalpy curve.

A multi-stage refrigeration system is then structured and associated with the air inlet to provide the multi-stage cooling along with the thermodynamic efficiencies in accordance with the divided psychrometric turbine inlet air cooling path enthalpy curve. The multi-step cooling stage system utilizes primary (direct) or secondary (indirect) cooled refrigerant which is circulated to absorb heat from the inlet air and transfers the same to a heat sink. Primary (direct) refrigerant is defined as one which actually changes state (boils or condenses) directly against its heat exchanger coil surface to produce cooling. Secondary (indirect) refrigerant is one which does not change state and is first cooled by a primary refrigerant and is then recirculated through its heat exchanger coil surface to produce cooling by the sensible transfer of heat. The inlet air cooling system is structured such that cooled primary or secondary refrigerant from the first cooling stage is cascaded from stage to stage as a precooling heat transfer coolant to exchange and subcool, directly or indirectly, against any subsequent stage of primary or secondary refrigerant to incrementally cool the inlet air to the desired optimum performance temperature (Currently, the general optimum air inlet temperature for maximum turbine performance is the air inlet "ice point", 32 F.). This technique of cascading the cooled primary or secondary refrigerant from stage to stage increases the Carnot thermal transfer efficiencies of the process.

The turbine drive and multi-stage refrigerant cooling system is then powered and adjusted to run based on current energy cost inputs to optimize the net revenues from prime mover output or electrical sales from the turbine generator set.

In one preferred embodiment for optimizing the power output and performance of a turbine, the turbine fuel controls are set at and inlet guide vanes positioned in the optimum position for maximum turbine efficiency. The staged refrigeration system is then used to control and modulate the inlet air temperature to operate the turbine at the optimum temperature to optimize turbine performance.

One variation of a gas turbine inlet air cooling system currently being installed in the Upper Midwest, uses well water at 52 F. to cool the inlet air for a Solar Saturn Gas Turbine Generator Set. The design inlet air temperature is 95 F. and the well water cooling system cools the air to 57 F. prior to it inlet into the turbine. This cooling effect increases the turbine output from 0.97 megawatts to 1.15 megawatts, a 19% increase. Further increases in power output are achieved by adding a second stage refrigerated coil in hybrid fashion which further cools the inlet air from 57 F. to 40 F. to provide a further increase of 0.05 megawatts for a total output of 1.20 megawatts, or a 24% increase from the 95 F. ambient temperature.

Recent studies of a Westinghouse 501D5 natural gas fired turbine generator set associated with a three stage gas turbine inlet air cooling system utilizing direct ammonia refrigerant revealed a 13% power output increase over that achieved with by an evaporative cooled gas turbine air inlet. In addition the heat rate was reduced by 4% at a constant power setting.

The three stage gas turbine inlet air cooling system consisted of three staged cooling coils in series utilizing ammonia (or other) primary refrigerant which was pump recirculated to the coils and back to each of the three dedicated pump accumulator vessels. The first stage coil cooled the air from 105 F. to 71 F. using 61 F. ammonia refrigerant. The second stage coil cooled the air from 71 F. to 55 F. using 45 F. ammonia. The third cool completed the cooling of the inlet air from 55 F. to 40 F. using 30 F. ammonia. Three ammonia compressors take the evaporated refrigerant from the three dedicated accumulators and compress it for condensing into liquid refrigerant in a common bank of evaporative condensers. This high pressure condensed liquid refrigerant then returns to the suction accumulators to repeat the heat transfer cycle. The refrigerant introduced to the second and third stage coils is precooled by the preceding stages and cascaded into the subsequent stages for maximum thermodynamic efficiency.

Lower optimal turbine operating temperatures can be achieved below the icing point of the air inlet to further increase gas turbine or internal combustion engine performance. In this embodiment, the inlet air is pre-cooled below the icing point and then re-heated (warmed) slightly by the incoming warm refrigerant or other means to prevent moisture in the air from condensing and freezing which could cause damage to the turbine blading. This further cooling then provides even more gas turbine output. It is theoretically possible to divide the psychrometric turbine inlet cooling path enthalpy curve into many (infinite) stages. The optimum system would depend on the capital cost and physical space limitations. Multiple substantially equal enthalpy stages and corresponding staged cooling systems are generally employed.

To further save energy in a gas turbine inlet air cooled system, if the waste heat from the turbine/engine exhaust can be utilized, this can become a source of direct absorption refrigeration or steam turbine driven compression refrigeration. This use of low grade waste heat provides increased prime mover or generator revenues by reducing parasitic refrigeration loads. The hybrid combination of waste steam turbine driven refrigeration compressors which would condense into steam absorber/chillers provides yet another possible technique. Additionally, gas turbine generator set output can be enhanced by the reduction of parasitic refrigeration energy by using direct gas fired absorber/chillers, internal combustion engine or gas turbine refrigeration system drivers.

By thermodynamically controlling the turbine operating parameters, daily inlet air temperature fluctuations are avoided.

This enables the turbine/engine to be operated at a constant temperature and pressure. This can result in reduced wear, as well as optimizing the electrical output from a turbine generator set or other prime mover application.

In areas where the electric energy revenues are dependent upon the time of generation, an algorithm control system based on the computer simulation model is generally employed to calculate the hourly costs of the fuel energy consumed to generate electric power vs. power sales revenues paid for the electricity produced to develop net cost curves. Based on these hourly net costs to operate the system, the fuel energy inputs to run the turbine generator set are adjusted to optimize net revenues, which may or may not correspond to the optimum turbine performance efficiencies. For example, instead of simple physical performance optimum energy comparisons, a computer program, such as that produced by Kohlenberger Associates Consulting Engineers, Inc. entitled "Program for Controlling Multi-Temperature Staged Refrigeration Systems", Copyright© 1992 by Kohlenberger Associates Consulting Engineers simulated on an Apple Macintosh computer, models the thermodynamic efficiencies of a sectionalized divided psychrometric turbine inlet air cooling path enthalpy curve of the average ambient air temperature turbine performance and the optimum air inlet temperature for maximum turbine performance at a given temperature and altitude. The program then assigns the hourly price of adding refrigerated cooling energy during peak electrical periods to reduce turbine fuel costs, while optimizing electrical output. The cost of added refrigeration energy to produce the increased electrical benefits at a given time is then calculated to generate a net revenue curve. The computer program thus calculates the operating parameters to produce optimum hourly net revenues so that the turbine generator set can be adjusted to generate optimum net revenues.

The present method and apparatus has resulted in net output increases in the turbine/generator set of 20–25% while at the same time reducing fuel usage 3 to 5%. These factors combined then increase operating revenues as much as 20 to 30 percent over those produced by conventional evaporative inlet air cooling systems. These cost savings and revenue increases are significant, particularly where employed with large electrical generation plants These savings will repay the total cost of refrigerated inlet air cooling systems within approximately two to four years.

DESCRIPTION OF THE DRAWINGS

FIG. 8 is a data summary of the performance analysis/comparison of a typical three stage inlet air cooling system for a Westinghouse 501D5 Combustion Turbine Generator Set.

DESCRIPTION OF THE ILLUSTRATED EMBODIMENTS

Figure 1:
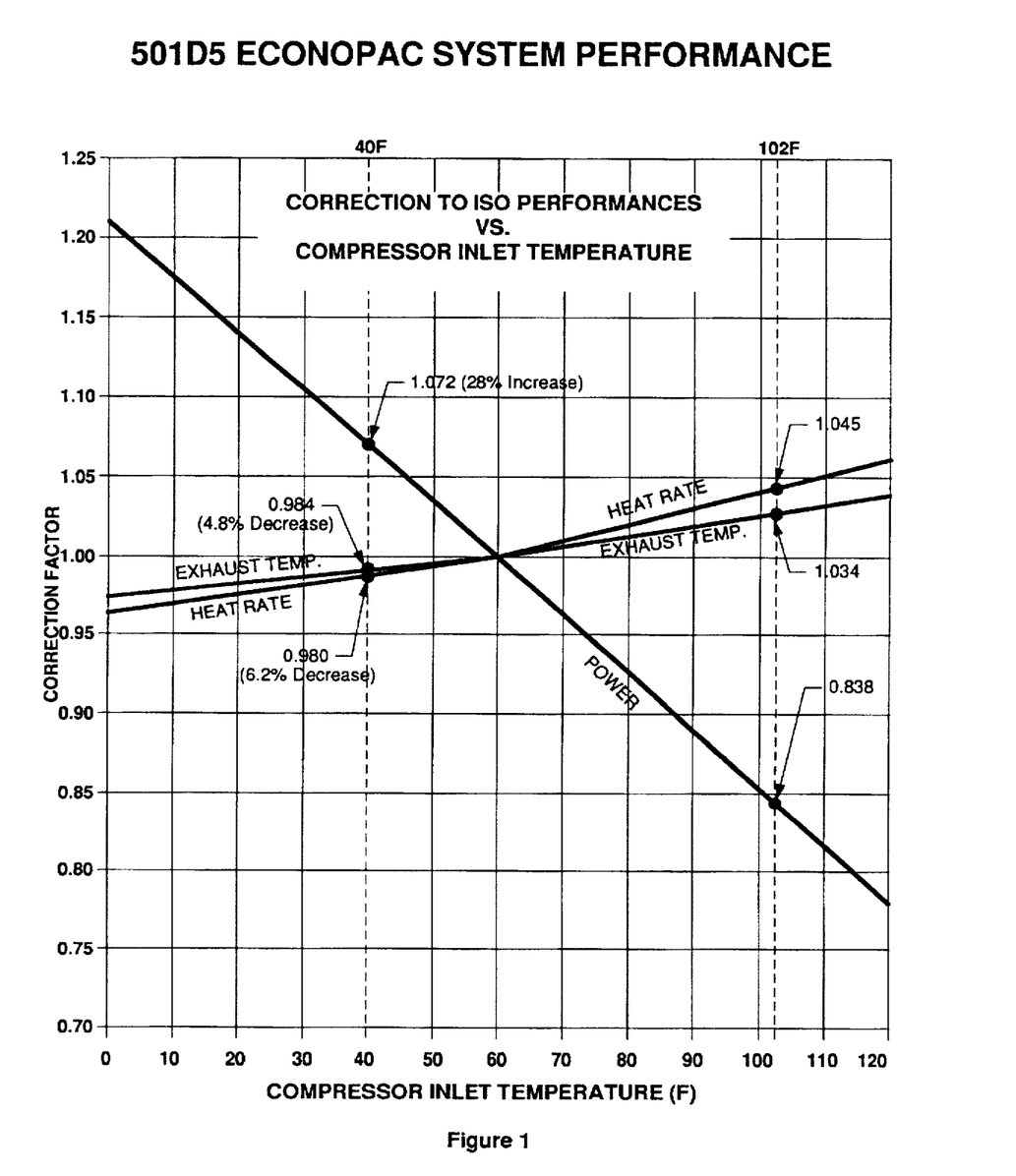
FIG. 1 is an example of a power output and heat rate correction curve for a Westinghouse 501D5 Combustion Turbine.

FIG. 1 illustrates the increase in turbine performance for a Westinghouse 501D5 natural gas fired combustion turbine as the turbine inlet air temperature is cooled to 40 F. At this point, the optimum power output is 107% of the turbine performance at the standard 59 F. ISO temperature.

Figure 2:
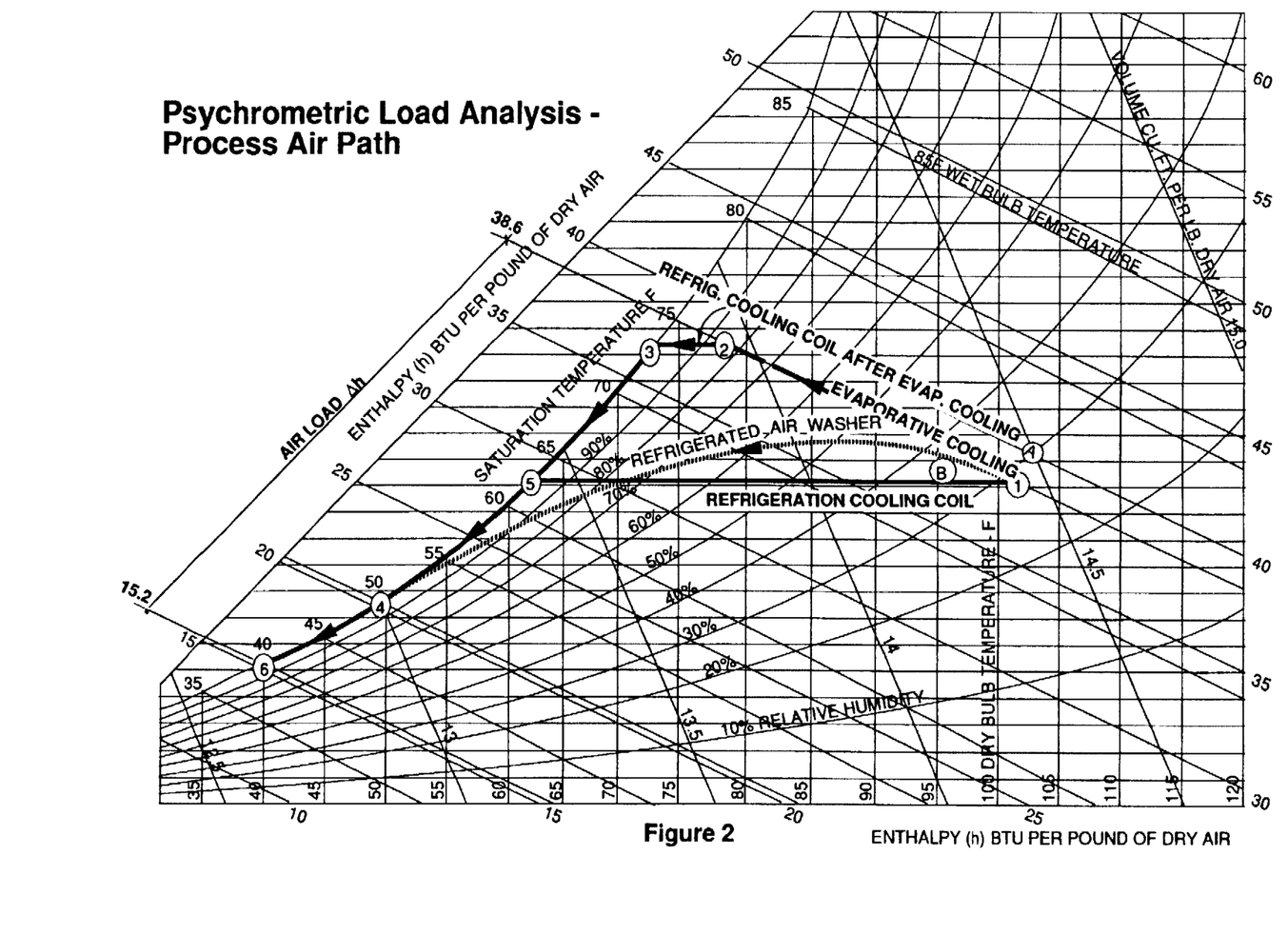
FIG. 2 is an example of a typical psychrometric chart of the Turbine Inlet Air Cooling Path of a Westinghouse 501D5 Combustion Turbine.
Figure 3:
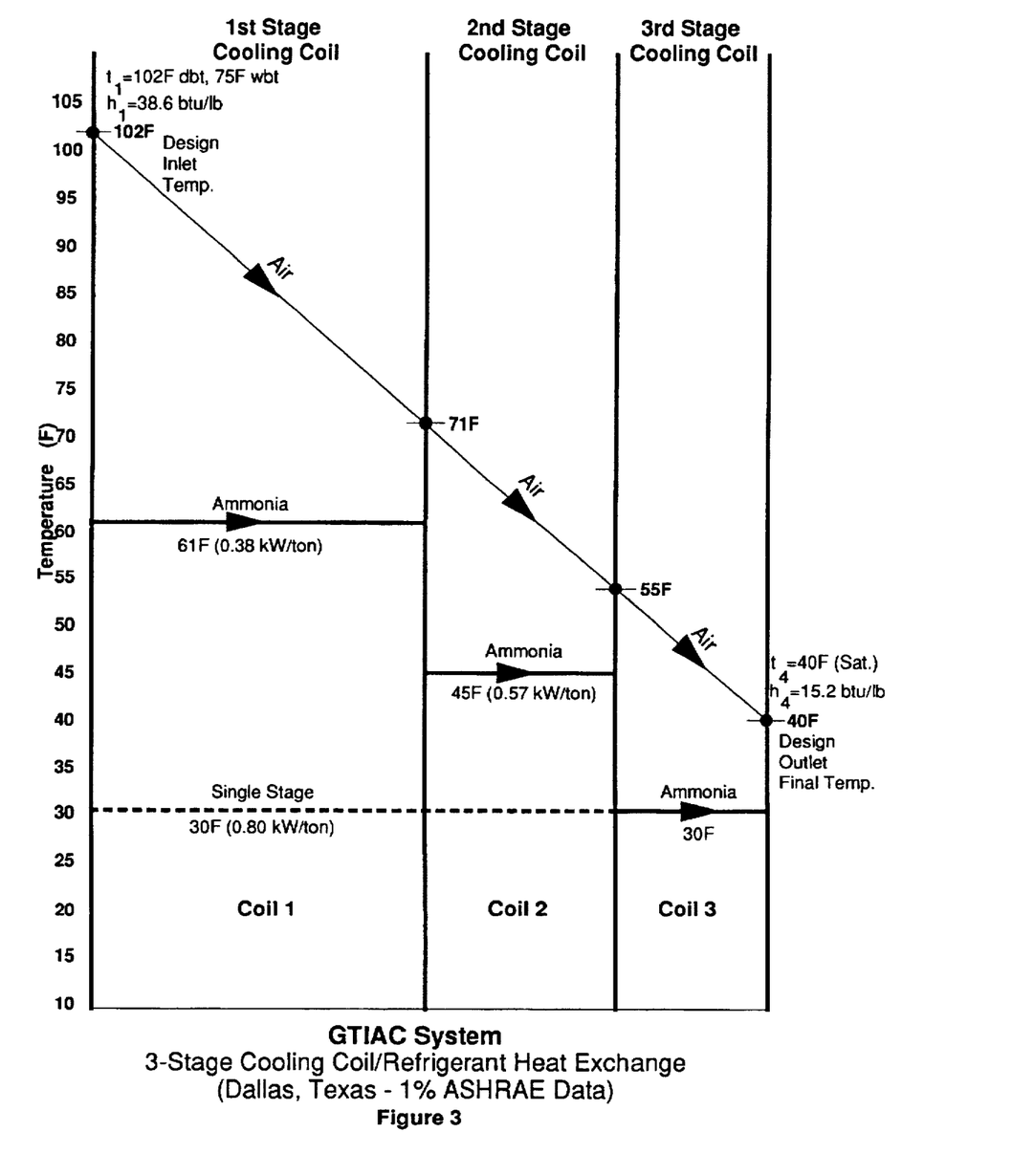
FIG. 3 is a schematic diagram of a three stage turbine inlet air cooling coil heat transfer.
Figure 5:
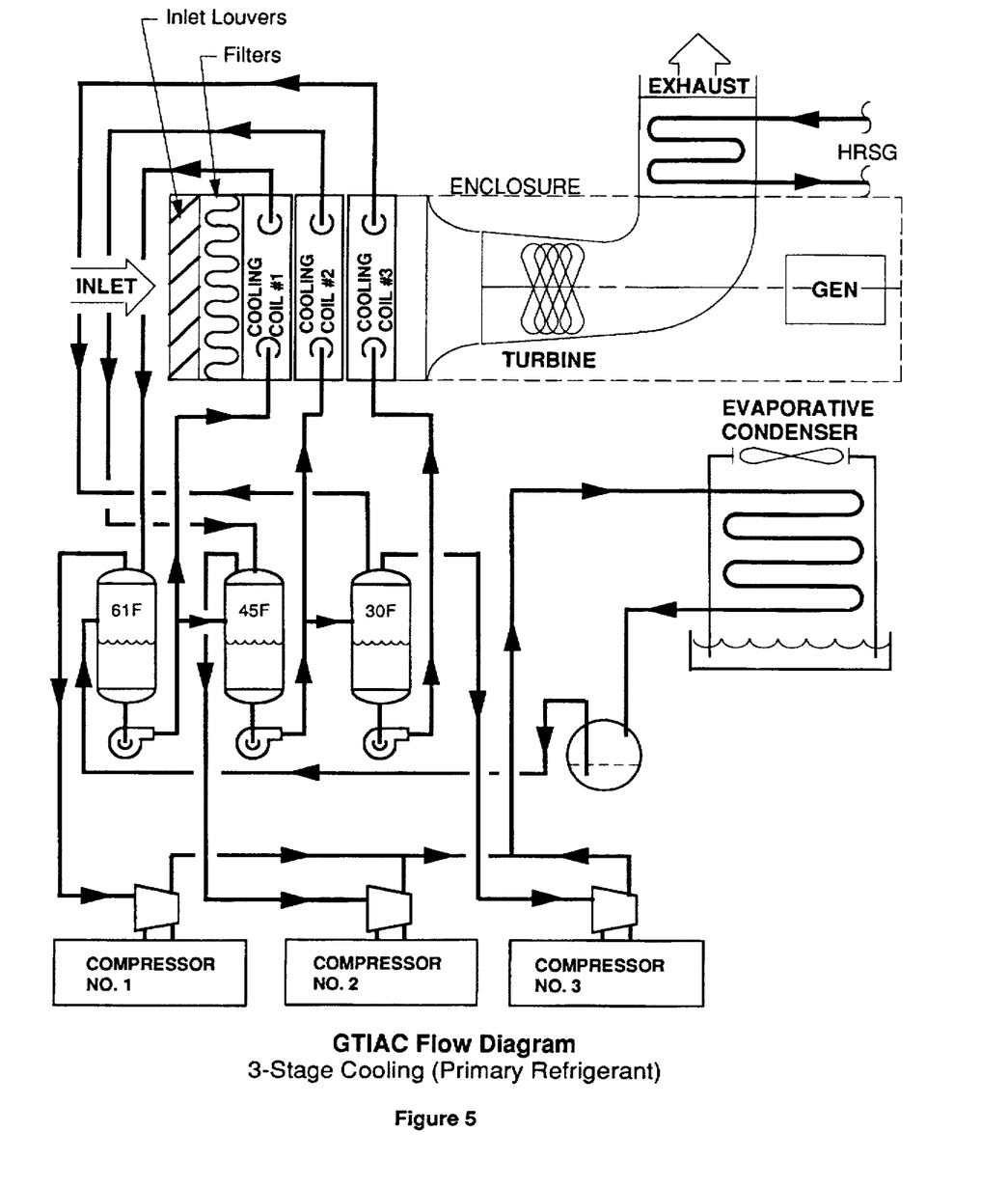
FIG. 5 is a schematic flow diagram of a three stage turbine inlet air direct refrigerant refrigeration system.

FIG. 2 illustrates a psychrometric chart showing the turbine inlet air cooling path for the three stage method and cooling system more particularly described in the schematic flow diagram shown in FIG. 3. This psychrometric chart was generated for a three stage coil heat transfer system associated with the turbine air inlet as shown in FIG. 5. FIG. 3 shows a first stage refrigerant coil utilizing ammonia as a refrigerant mounted within the air inlet to reduce the inlet air from 105 F. DBT to 71 F. utilizing ammonia refrigerant at 61 F. The ammonia coolant from the first stage cooling coil is cooled and then passed into a second stage cooling coil within the air inlet to reduce the temperature from 71 F. to 55 F. DBT, using 45 F. refrigerant. The third stage cooling coil then reduces the airstream from 55 F. to 40 F. using 30 F. refrigerant.

Figure 4:
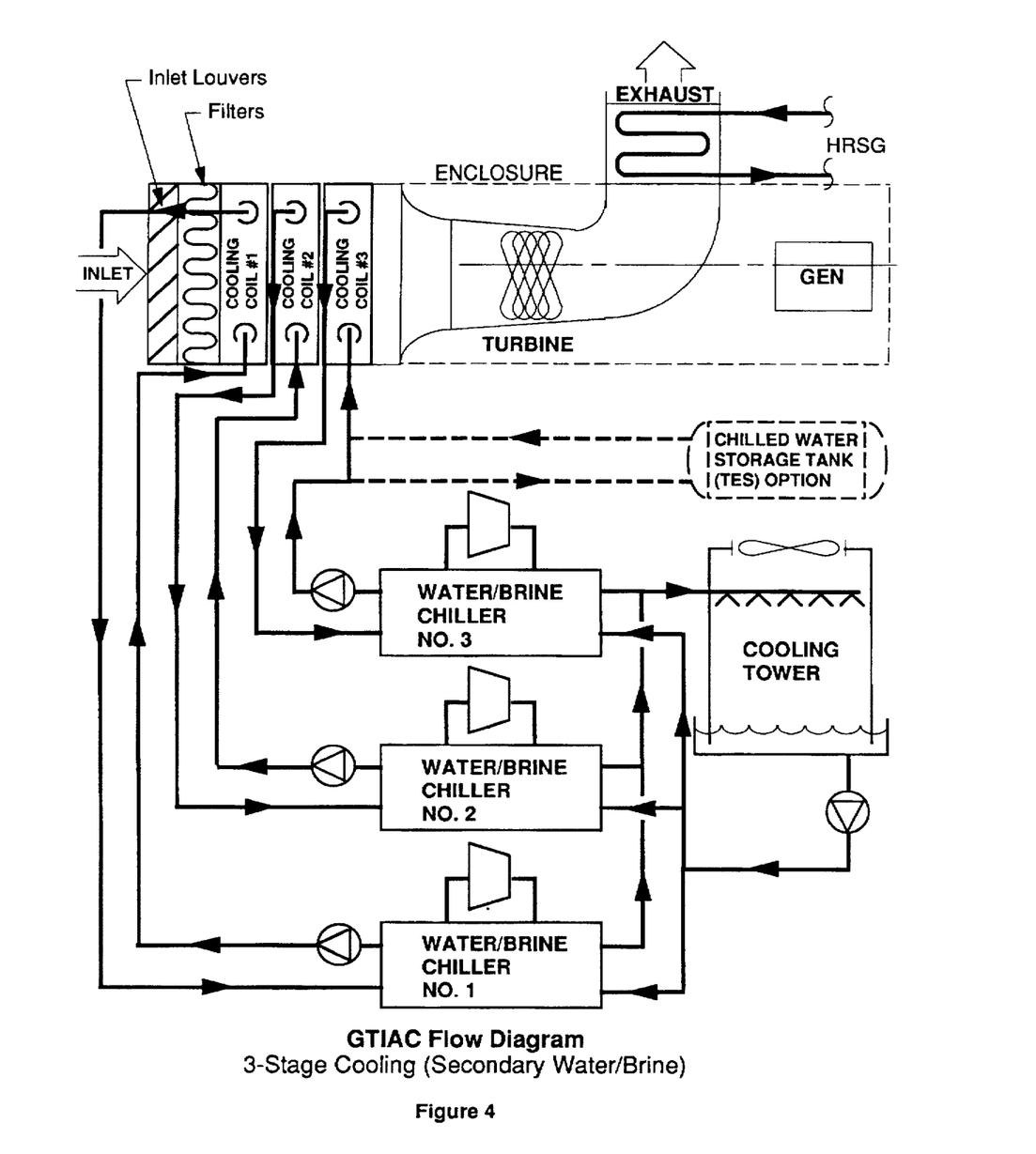
FIG. 4 is a schematic flow diagram of a three stage turbine inlet air water chiller refrigeration system.

The schematic flow diagram of a water chiller turbine air inlet refrigeration system arrangement is shown in FIG. 4. Cooling coil 1 using chilled water as a coolant is mounted upstream of cooling coil 2 within the air inlet. A first water chiller 1 is operationally connected with the first cooling coil 1. The water coolant from the first cooling coil 1 is used to precool the refrigerant in chiller 2. A separate water chilling circuit in water chiller no. 2 is used in coil no. 2 to further cool the inlet air using water at a lower temperature. Chilled water in the no. 2 circuit is also used to precool refrigerant in chiller no. 3. Finally, water chiller no. 3 is used with coil no. 3 to cool the inlet air to its final temperature with the lowest chilled water temperature. This is the optimal inlet air temperature; thereby optimizing the performance of the turbine driving an electric generator.

An optional chilled water, ice, or other thermal energy storage tank or means may be associated with the water chilling loop to store chilled water as coolant feed for the refrigeration system produced during off-peak hours when the price paid for electricity is lowest—i.e. the turbine generator is operated during off peak hours to produce less electricity and more refrigerated coolant. This chilled water or ice in storage then cools the inlet air without having the chillers operating during the peak power periods, thereby reducing the refrigeration parasitic power and increasing the net output of the turbine/generator set.

FIG. 5 illustrates an ammonia refrigeration system, wherein a first stage compressor, no. 1, a second compressor, no. 2, and a third stage compressor, no. 3, are operably associated with a first stage cooling coil 1, a second stage cooling coil 2, and a third stage cooling coil 3 to stepwise reduce the temperature of the inlet air in a similar fashion to that described above.

Figure 6:
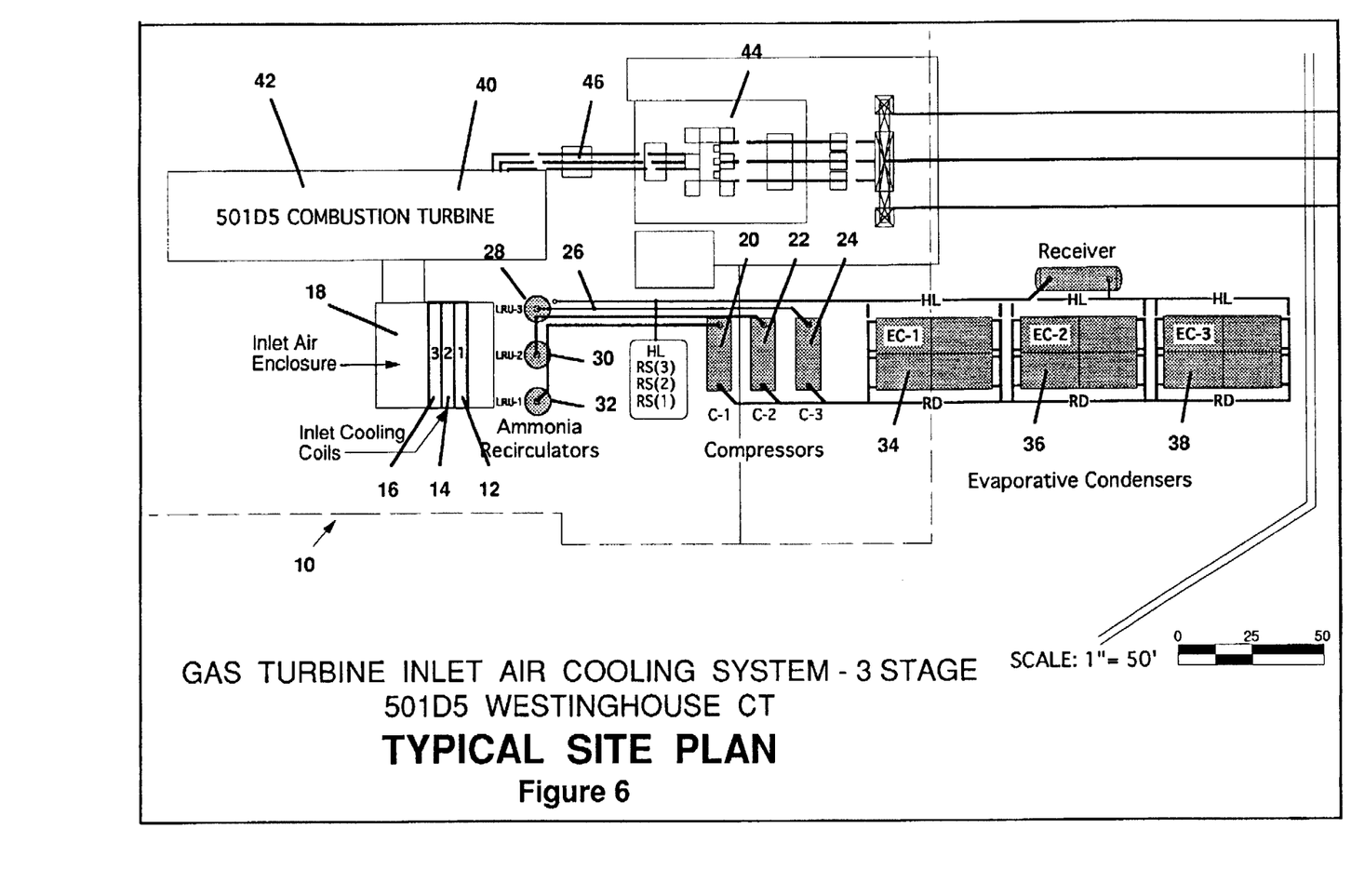
FIG. 6 is a plan view of a Westinghouse 501D5 Combustion Turbine Generator Set three stage cooling turbine inlet air refrigeration system.

FIG. 6 is a plan view of the Westinghouse 501D5 combustion turbine air inlet refrigeration system 10. Three cooling coils, 12, 14, 16 are located within the turbine air inlet 18, and operably associated with three compressors 20, 22, 24. The ammonia coolant of the three cooling coils, 12, 14, 16 is interconnected as shown with refrigerant lines 26 forming a circuit along with three ammonia recirculators 28, 30, 32, and three evaporative condensers 34,36,38 to make a complete three stage system for cooling the inlet air for the gas turbine generator. The gas turbine generator set 40 consists of a simple cycle natural gas fired Westinghouse 501D5 combustion turbine 42 driving an 80 megawatt electric generator 44. A motor/turbine control center 46 controls the ignition and feed of the combustion fuel entering the gas turbine 42, as well as the electricity required to operate the electrical compressor drives (not shown) to lower the temperature of the cooling coils 12,14,16. This motor/turbine control center 46 has sensors (not shown) within the air inlet to insure that the air entering the turbine cabinet 48 is of constant temperature and pressure to optimize the performance of the gas turbine 42.

Three evaporative condensers 34,36,38 are associated with the refrigeration system 10 to dispel heat of compression and condensation within the refrigeration cycle.

Figure 7:
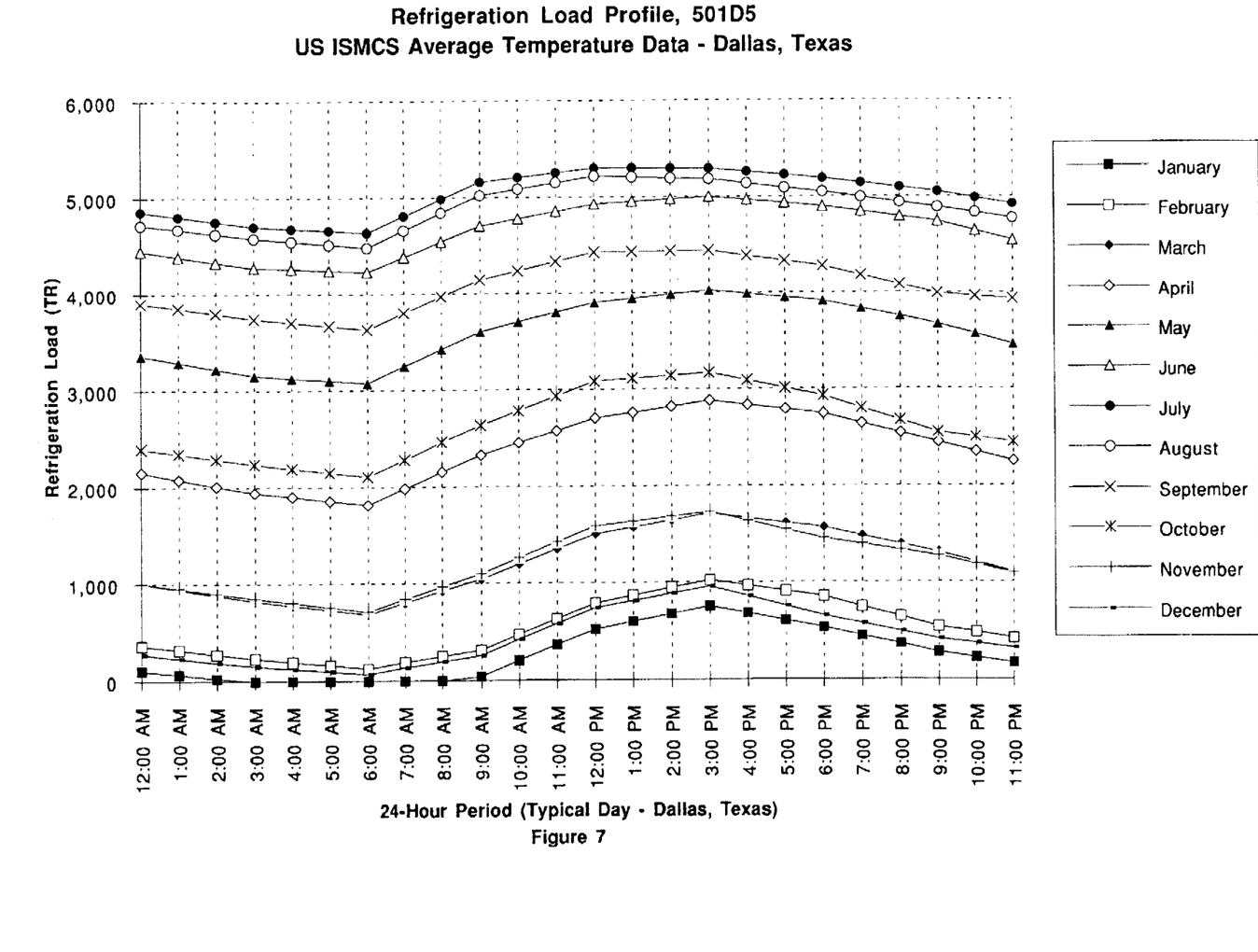
FIG. 7 is a refrigeration load profile for a Westinghouse 501D5 Combustion Turbine Generator Set inlet air cooling system.
Figure 9:
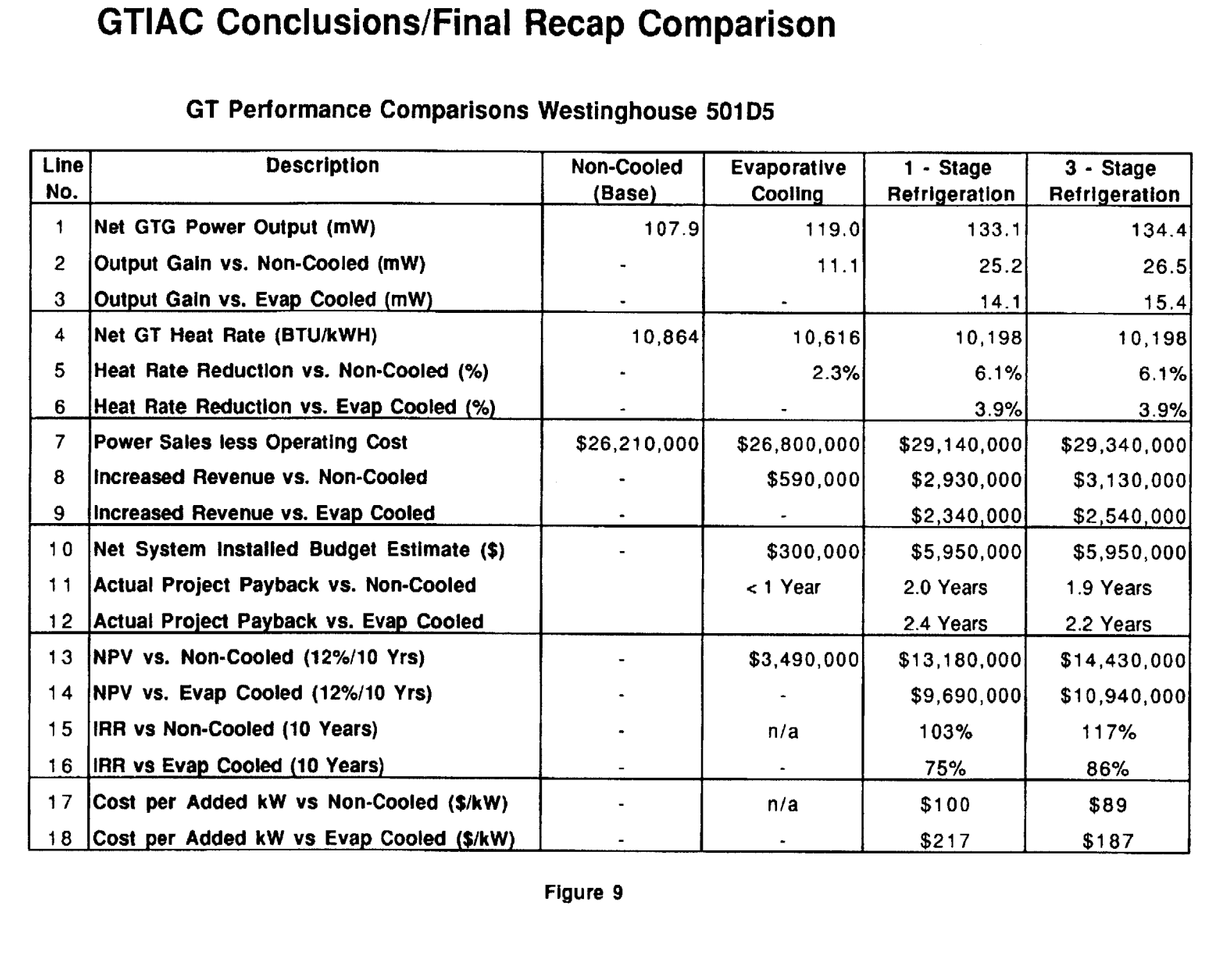
FIG. 9 is a data summary of the operating cost analysis, performance, and net increases in electrical revenues for the Westinghouse 501D5 Combustion Turbine Generator Set three stage inlet air cooling system.

A typical refrigeration load profile to cool the inlet air over a 24 hour period is shown in FIG. 7. A typical operating cost profile for a three stage inlet air cooling system is shown in FIGS. 8 and 9. FIG. 8 is a data summary of the performance analysis/comparison of a typical three stage inlet air cooling system for a Westinghouse 501D5 Combustion Turbine Generator Set. FIG. 9 is a data summary of the operating cost analysis, performance, and net increases in electrical revenues for the Westinghouse 501D5 Combustion Turbine Generator Set three stage inlet air cooling system.

As can be seen from the tables in FIGS. 8 and 9, electrical revenues paid for electricity produced generally vary based on the time of day that these power deliveries are made. Therefore, a computer (not shown) with a revenue/cost algorithm is generally associated with the motor/turbine control center 46 to optimize the hourly net energy outputs by producing maximum electricity during on-peak electrical pricing periods. If a thermal storage system is utilized, stored cooled secondary refrigerant produced and stored during off-peak pricing periods is then circulated during on-peak electrical pricing periods to optimize the production of electricity with minimal refrigerant costs.

The three stage turbine air inlet refrigeration system thus produces significant net revenues by optimizing the performance of the turbine generator set 40.

Although this specification has made reference to the illustrated embodiments, it is not intended to restrict the scope of the appended claims. The claims themselves recite those features deemed essential to the invention.

I claim:

1. A method for optimizing the power output and performance of combustion prime movers, gas turbines and internal combustion engines having air inlets taking in inlet air for admixture with fuel for combustion, and associated with a prime mover load application to increase power output and reduce fuel consumption, comprising:

a. inputting into a computer processor a data base containing the prime mover's performance output, fuel consumption, heat rate, load application power, output power, parasitic load consumption, and other related performance system information, b. computer generating optimal thermodynamic cooling efficiencies corresponding to a sectionalized, sequentially divided psychrometric turbine inlet air cooling path enthalpy curve of an average ambient air temperature prime mover performance and the optimum air inlet temperature for maximum prime mover performance, c. structuring and providing a staged refrigerant cooling system having separate refrigerant cooling components mounted within and associated with the air inlet to provide incremental sequential staged cooling of the inlet air by circulating refrigerant to absorb heat from the inlet air and deliver the absorbed heat to a heat sink to increase the cycle efficiency of the refrigeration system by using cooled condensate to subcool the liquid refrigerant before expansion,

7 d. cascading from stage to stage cooled primary or secondary refrigerant from a first cooling stage as a precooling heat transfer coolant to exchange against and subcool any subsequent stage of primary or secondary refrigerant to sequentially cool the inlet air to a desired temperature for optimum prime mover performance, e. inputting into the computer processor current operating costs associated with fuel consumption, maintenance, and other related operating costs of the prime mover, and current revenues from energy generation by the prime mover load application, f. generating an optimal net revenue performance curve for the prime mover and prime mover load application, and g. powering and adjusting power means to drive the prime mover and multi-stage refrigerant cooling system in accordance with the optimal net revenue performance curve.

2. A method for optimizing the power output and performance of combustion prime movers according to claim 1, wherein the psychrometric turbine inlet air cooling path enthalpy curve is divided into multiple substantially equal stages.

3. A method for optimizing the power output and performance of combustion prime movers according to claim 2, wherein the multi-stage refrigerating system employs a combination of cooled primary or secondary refrigerants performing in concert and in separate staged cooling coils as heat transfer media.

4. A method for optimizing the power output and performance of combustion prime movers, according to claim 2, wherein the staged refrigerating system employs indirect secondary coolants such as chilled water, brines, and the like as heat transfer media.

5. A method for optimizing the power output and performance of combustion prime movers according to claim 1, wherein the inlet air is pre-cooled below the icing point, and then reheated with warm refrigerant to prevent freezing to maximize prime mover performance and refrigeration cycle efficiency.

6. An apparatus for optimizing the energy power output and performance of combustion prime movers having air inlets taking in inlet air at the minimum acceptable inlet air temperature to prevent damage to the prime mover and its auxiliary components for admixing with fuel for combustion, and associated with a prime mover load application, comprising:

a. a staged refrigerant cooling system including a first compressor and at least one successive compressor operably associated with a first cooling coil and at least one successive cooling coil mounted within and associated with the air inlet of the prime mover to sequentially cool the inlet air in multiple stages in accordance with a sectionalized, divided, psychrometric turbine inlet air cooling path enthalpy curve showing the average ambient air temperature prime mover performance and the optimum air inlet temperature for maximum prime mover performance by sequentially circulating within the coils cooled refrigerant to absorb heat from the inlet air in stages and deliver the absorbed heat to a heat sink to increase the cycle efficiency of the refrigeration system by using cooled condensate to subcool the liquid refrigerant before expansion;

b. power means to drive the prime mover and multi-stage refrigerant cooling system compressor components, c. transfer and cascading means associated with the cooling system to transport cooled primary or secondary refrigerant from a first cooling stage of the refrigerant cooling system as a precooling heat transfer coolant to exchange against succeeding stages of direct or indirect refrigerant in successive subsequent cooling stages of the refrigerant cooling system to successively cool the inlet air to the optimum prime mover performance inlet air temperature, d. a computer processor with a data base of current operating costs associated with fuel consumption, maintenance, and other related operating costs of the prime mover, and current revenues from energy generation by the prime mover load application, which generates the optimal net revenue performance curve for the prime mover and prime mover load application, and f. power controls to adjust the power means to drive the prime mover and staged refrigerant cooling system compressor components in accordance with the optimal net revenue performance curve.

7. An apparatus for optimizing the power output and performance of combustion prime movers according to claim 6, wherein the prime mover is a gas turbine, and the load application is an electrical generator producing electricity.

8. An apparatus for optimizing the power output and performance of combustion engine prime movers according to claim 6, wherein the cooling system employs primary direct refrigerant.

9. An apparatus for optimizing the power output and performance of combustion engine prime movers according to claim 6, wherein the cooling system employs indirect secondary refrigerant cooled by an absorption refrigeration system powered by exhaust heat from the prime mover.

10. An apparatus for optimizing the power output and performance of combustion prime movers according to claim 6, including a computer with a revenue and cost algorithm modelling a simulation program associated with the power controls to optimize hourly net energy outputs.

11. An apparatus for optimizing the power output and performance of combustion prime movers according to claim 6, wherein the prime mover is a turbine with the turbine fuel controls set at and inlet guide vanes positioned in the optimum position for maximum turbine efficiency, and the staged refrigeration system is then used to control and modulate the inlet air temperature to operate the turbine at the optimum temperature to optimize turbine performance.

* * * * *